United States Patent [19]

Takano et al.

[11] Patent Number: 4,979,083
[45] Date of Patent: Dec. 18, 1990

[54] LAMP WITH AN INTEGRAL SWITCH

[75] Inventors: Tsunesuke Takano; Kouichi Shinzawa, both of Tokyo, Japan

[73] Assignee: Daiichi Denso Buhin Co., Ltd., Tokyo, Japan

[21] Appl. No.: 396,896

[22] Filed: Aug. 22, 1989

[30] Foreign Application Priority Data

Aug. 24, 1988 [JP] Japan ............................ 63-110922[U]
Aug. 29, 1988 [JP] Japan ............................ 63-113168[U]
Dec. 7, 1988 [JP] Japan ............................ 63-159072[U]
Dec. 7, 1988 [JP] Japan ............................ 63-159073[U]

[51] Int. Cl.⁵ ............................................. F21V 23/04
[52] U.S. Cl. .................................... 362/394; 362/155; 362/295; 200/61.76; 439/612
[58] Field of Search ................. 362/95, 155, 221, 226, 362/295, 394; 439/612; 200/61.76

[56] References Cited

U.S. PATENT DOCUMENTS 2,164,149 6/1939 Underdorfel ................ 200/61.76 X
4,554,618 11/1985 Batunno et al. ..................... 362/155

FOREIGN PATENT DOCUMENTS 2143557 3/1973 Fed. Rep. of Germany ...... 362/394
5722633 6/1977 Japan .

Primary Examiner—Stephen F. Husar
Attorney, Agent, or Firm—Nixon & Vanderhye

[57] ABSTRACT

A lamp with an integral switch comprises a push switch knob assembly including a knob (33) mounted in a tubular member (31) and urged by a spring (33). The lamp can be mounted such that the switch knob (33) is maintained in its retracted position by something such as a closed trunk hood of an automobile thereby breaking the circuit between a power source and a bulb (4) of the lamp, and is allowed to be moved to its extended position under the action of the spring (33) making the circuit between the power source and the bulb (4). It can be conveniently used for automatically illuminating a trunk room of an automobile, for example, when its trunk hood is opened.

7 Claims, 17 Drawing Sheets

LAMP WITH AN INTEGRAL SWITCH

FIELD OF THE INVENTION

The present invention relates generally to a lamp having an integral switch, and more particularly to an integral lamp and switch which can be mounted on an automobile, for example, and can be turned on and off by opening and closing, respectively, the trunk hood so as to illuminate the trunk space.

BACKGROUND OF THE INVENTION

An example of one type of lamp is described in Japanese utility model publication No. 22633/1982. The lamp of Japanese Publication No. 22633/1982 includes a pair of sockets for a bulb, each socket comprising a U-shaped bent plate having a bottom in the middle and a pair of mutually facing legs or squeezing pieces on both sides thereof. Each of the squeezing pieces have a mounting bore therethrough. A base body having a pair of spaced socket-insertion bores formed therethrough is also provided such that each socket-insertion bore include pair of protrusions extending inward from opposite inner walls thereof. These protrusions are adapted to being snap-fit in the mounting bores formed through the pair of squeezing pieces. A switch lever is pivoted to the base body and a resilient piece forming a switch mechanism has one end fixed to the base body between either the socket or the switch lever, with its other end adapted to being brought into contact with one of the squeezing pieces of one of the sockets by the action of the switch lever.

In the above-described prior art lamp, which has been developed mainly for use as an interior room lamp of an automobile, the switch lever projects from the base body horizontally relative to the flat base body face. The base body adapted to mounting a bulb of the lamp thereon. The switch lever, furthermore, is pivotal. As such, the prior art lamp described above is not suitable for use as a trunk lamp which needs to be activated in response to the opening/closing of a trunk hood so as to illuminate the interior of the trunk. Moreover, the structure of the lamp switch is such that it may be broken by large forces associated with the opening or closing of the trunk hood.

SUMMARY OF THE INVENTION

In order to overcome these problems, an object of the present invention is therefore to provide an arrangement which is easier to assemble, operate and mount by providing a push switch which is perpendicular to, and integral with, an insulating base plate for mounting bulb sockets.

In accordance with the present invention, the above object is achieved by a lamp which includes a pair of bulb sockets adapted to receiving a bulb therebetween. Each of the bulb sockets comprises a conductive plate bent into a U having a pair of squeezing pieces and with mounting bores formed in the pair of squeezing pieces. Connecting pieces extend from the conductive plates an insulating base plate is formed with socket-insertion sections having protrusions which fit into the mounting bores. A tubular member formed integrally with the insulating base plate is adapted to receive a switch knob. A self-projecting push switch is mounted within the tubular member with the switch knob together with a movable contact piece and a spring. The movable contact piece is slidable on a fixed contact piece extending from the connecting piece emerging at the inner wall of the tubular member as well as on another fixed contact piece having a connecting terminal.

The lamp, mounted in the trunk space of an automobile, for example, is maintained in the off state by virtue of the movable contact piece being separated from the fixed contact pieces since the switch knob is pressed by the trunk hood when the trunk hood is in its closed position.

The switch knob, which has been depressed against the spring by the hood, is allowed to be pushed upwardly by the spring within the tubular member when the trunk hood is opened. The movable contact mounted to the switch knob will then rise with the knob so as to electrically interconnect the two fixed contact pieces thereby turning the lamp on to illuminate the interior of the trunk space. The illuminated lamp will thus facilitate the loading or unloading of the trunk at night.

BRIEF DESCRIPTION OF THE DRAWINGS

The present invention will now be described, by way of example, with reference to the accompanying drawings, in which the same reference numerals designate a similar or identical parts or elements, and in which:

FIG. 7 is another enlarged sectional view of the push switch taken in a direction different from that in which FIG. 5 is taken;

DESCRIPTION OF THE PREFERRED EMBODIMENTS

Figure 1:
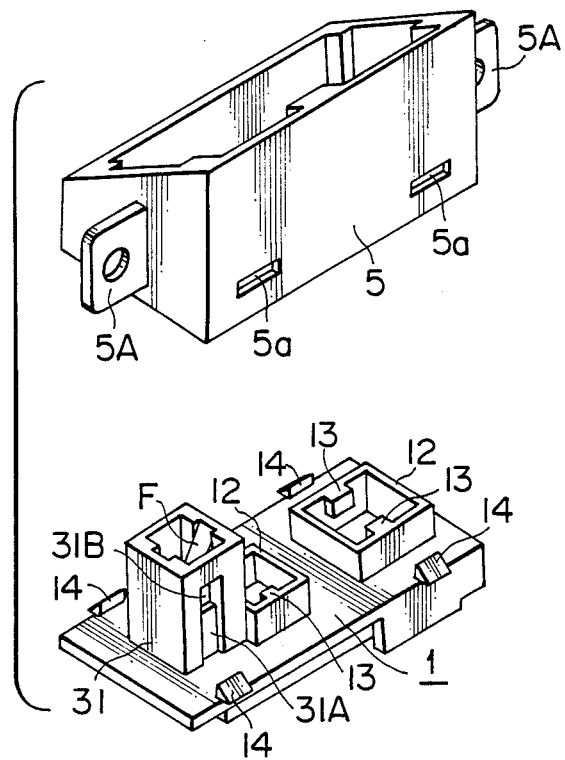
FIG. 1 is an exploded perspective view of a protective frame and an embodiment of the lamp with an integral switch according to the present invention.
Figure 2:
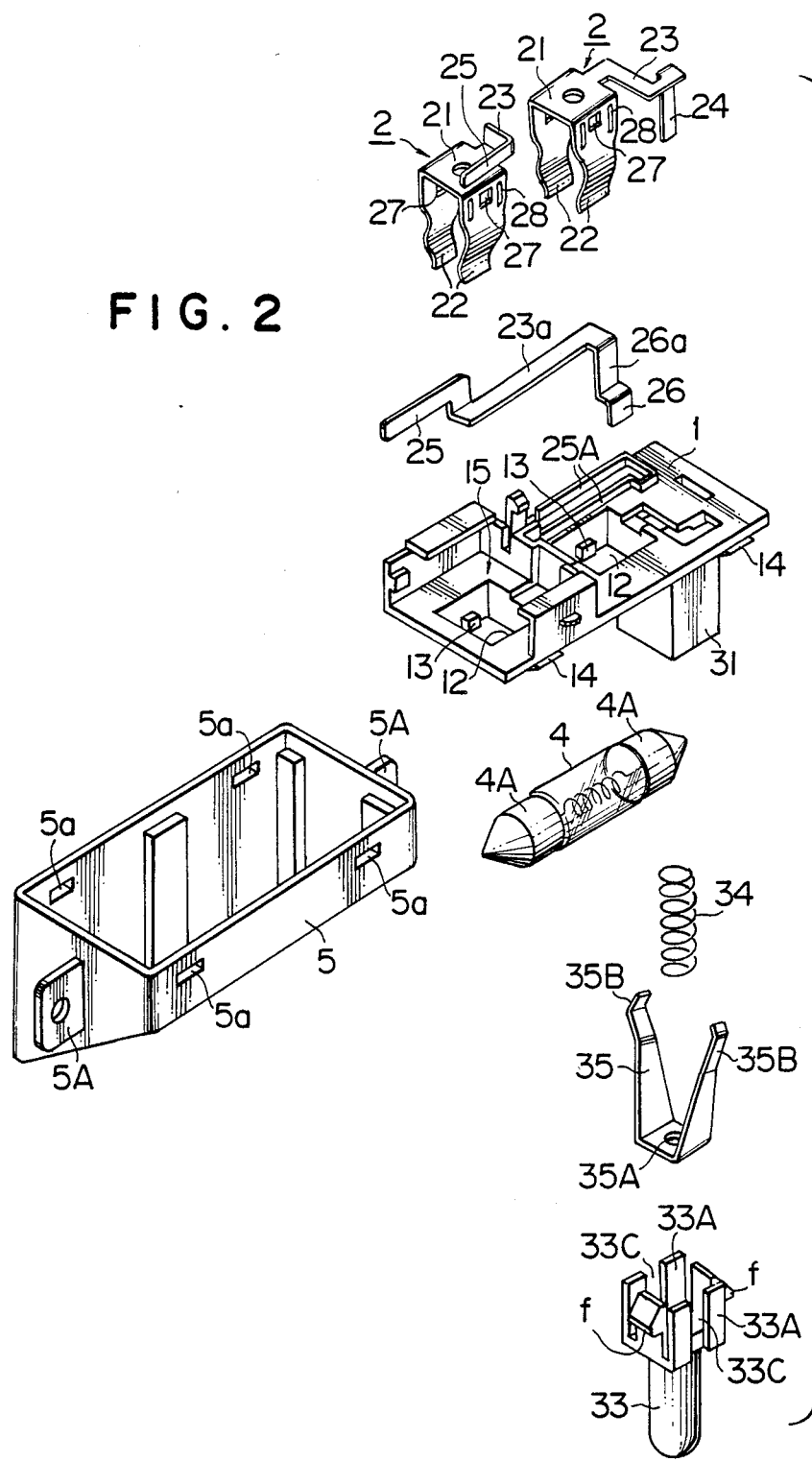
FIG. 2 is an exploded perspective view of various components of the lamp.
Figure 4:
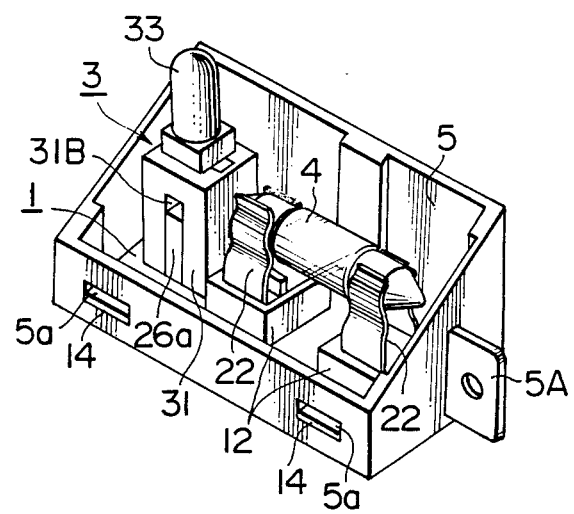
FIG. 4 is a perspective view of the lamp with a switch as viewed from above.
Figure 5:
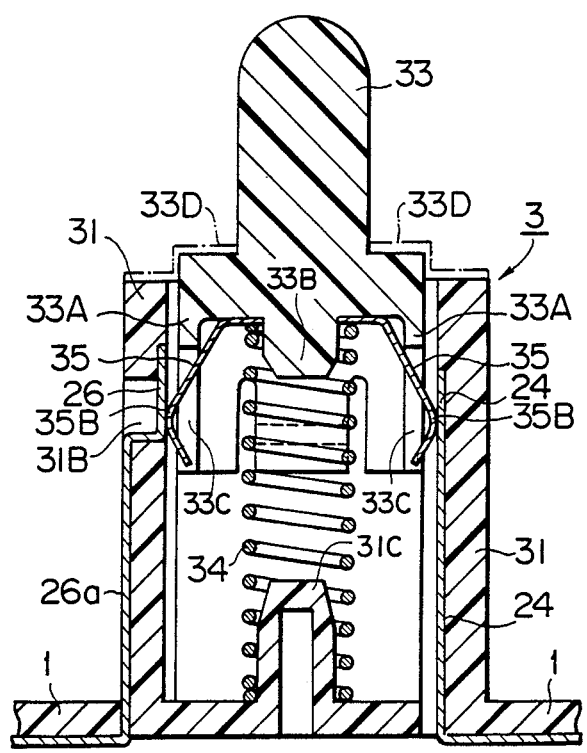
FIG. 5 is an enlarged detailed sectional view of the principal part of the push switch in one position included in the lamp of the foregoing figures.

Referring now to the drawings, and in particular to FIG. 2, an embodiment of the lamp with an integral switch according to the present invention is shown and generally comprises a pair of bulb sockets 2, each of which includes a conductive plate 21 bent into a U having a pair of squeezing pieces 22 for mounting a bulb 4 therebetween. Mounting bores 27 are formed through the pair of squeezing pieces 22 while connecting pieces 23 extend from the conductive plates 21. An insulating base plate 1 having socket-insertion sections 12 formed therethrough is provided with protrusions 13 adapted to fit into the mounting bores 27, as shown in FIGS. 1 and 2. A tubular member 31 which is formed as an integral part on one side of the insulating base plate 1 receives an outwardly-projecting push switch assembly 3, as shown in FIGS. 4 and 5. The push switch assembly 3 includes tubular member 31 in which the switch knob 33, together with a movable contact piece 35 and a spring 34 are mounted. The movable contact piece 35 is slidable along a fixed contact piece 24 extending from the connecting piece 23 emerging at the inner wall of said tubular member 31. Another fixed contact piece 26 extends from a connecting terminal 25 attached to the insulating base plate 1.

As shown in FIG. 1, the insulating base plate 1 may be provided on the top face thereof with projecting frames 12A respectively surrounding the socket-insertion sections 12. Each of the socket-insertion section defines a rectangular hole and is provided with a pair of protrusions 13 on opposing inner walls thereof for fastening the bulb sockets 2.

The base plate 1 is also provided with fastening protrusions 14 on opposing sides thereof and cooperate with apertures 5a so as to mount a protective frame 5. The protective frame 5 (and thus the lamp/switch assembly) may then be mounted within an automobile trunk via mounting ears 5A. A conductive piece 23a having a fixed contact piece 26 and a connecting terminal 25 is laid flat in a region between a pair of mounting ribs 25A on the bottom face of the base plate 1.

To make the bulb sockets 2, a conductive flat spring of a suitable material such as phosphor bronze, German silver or beryllium copper is punched to form generally T-shaped plates which are then folded into substantially U-shaped members each having a bottom and legs (or squeezing pieces) 22 on opposite sides of the bottom. As shown in FIG. 2, one of the bulb sockets 2 is formed with an L-shaped connecting piece 23 having a connecting terminal 25 at its end and extending from one side of the bottom, while the other bulb socket 2 is formed with a crank-shaped connecting piece 23 having an end which is adapted to lie as a fixed contact along the tubular member into which the knob 33 of push switch 3 is inserted.

Each squeezing piece 22 has a mounting bore 27 formed substantially at its middle portion and into which a corresponding one of the protrusions 13 in the socket-insertion sections 12 is inserted to fasten the same. A rib 28 reinforces the squeezing piece and forms a gap between the squeezing piece and the inner wall of the socket-insertion tube 12 so as to achieve a "chimney effect" for dissipating heat.

The push switch 3 has an arrangement as shown in FIGS. 4, 5, 6 and 7.

Figure 7:
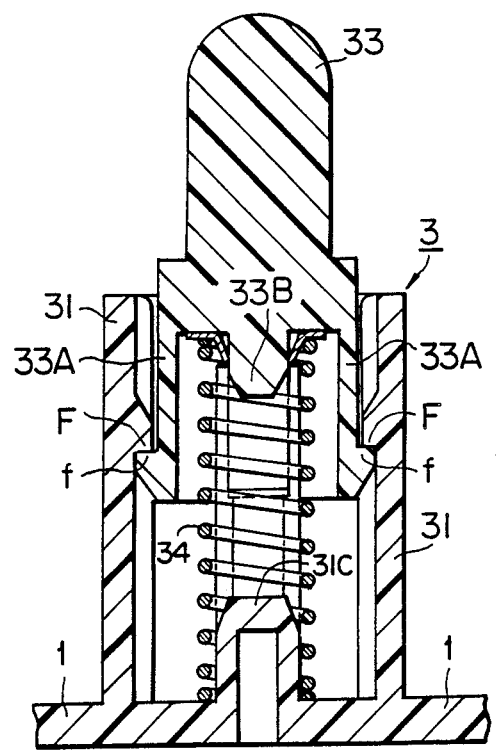

A tubular member 31 of rectangular cross section into which the switch knob 33 is inserted, is integrally formed on one side of the above-described base/plate. The tubular member 31 has a bottom on which a projection 31c is formed. A spring 34 is placed around the projection 31c. The base portion of the tubular member 31 defines a hole 31d through which the fixed contact piece 24 extends into the interior of tubular member 31. The tubular member 31 has formed on one side thereof a fixed contact piece insertion hole 31B through which the fixed contact piece 26 extends from the connecting terminal 25 and into the interior of the tubular member 31. The opposite inner wall has a groove formed therein, in which the fixed contact piece 24 is seated so as to stand upright and flush along, the inner wall. Hook portions F are formed on the two inner walls other than those on which the facing fixed contacts 24 and 26 emerge, for preventing the switch knob 33 from being drawn out, as shown in FIG. 7.

The switch knob 33, as shown in FIG. 2, is made of an insulating material the same as the tubular member 31. The knob 33 has a knob box 33A of rectangular cross section, on the bottom of which there is provided a projection 33B on which the inverted substantially U-shaped movable contact piece 35 and a spring 34 are successively mounted. The box 33A has splits 33C formed in the two opposite side walls adjacent to the open end to allow the movable contact piece 35 to extend outwardly from the box 33A. Hook portions f formed on outer side surfaces of the other two walls at the open end of the box are adapted to engage with the hook portions F of the tubular member 31 for preventing the switch knob 33 from being drawn out.

The protective frame 5 is a rectangular member made of a synthetic resin and having a size such that it can contain the insulating base plate 1. The frame has opposite end plates in which slots 5a are formed, the slots being adapted to receive the fastening protrusions 14 of the insulating base plate 1.

The components of the lamp, arranged as described above, are assembled as follows:

First, the bulb sockets 2 are inserted into the socket-insertion sections 12 in the insulating base plate 1 from below until the protrusions 13 enter the mounting bores 27 and the sockets are thus fastened to the base plate. The connecting terminal 25 of one of the bulb sockets 2 is arranged in a lead connecting terminal mounting section 15, as shown in FIG. 3.

Figure 6:
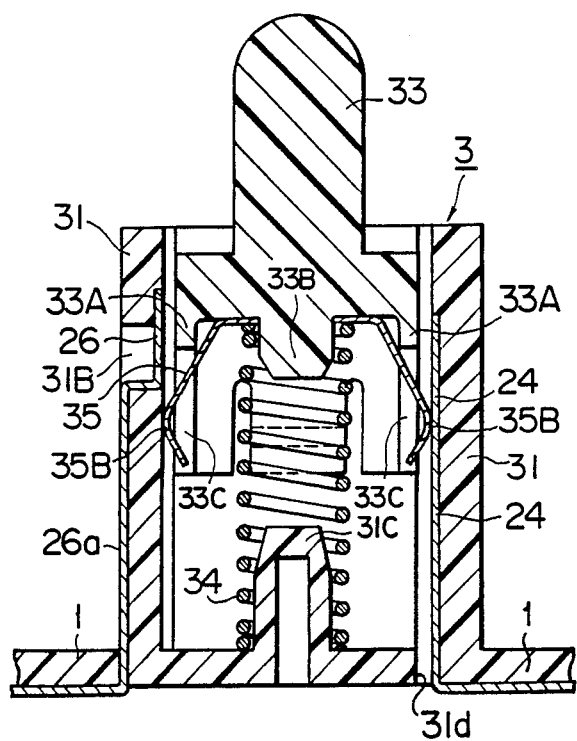
FIG. 6 is another enlarged sectional view of the push switch in a different position.

The fixed contact piece 24 extending from the connecting piece 23 of the other bulb socket 2 is inserted from below through the introduction hole 31d in the base plate 1 into the interior of the tube 31, as shown in FIGS. 5 and 6.

Figure 3:
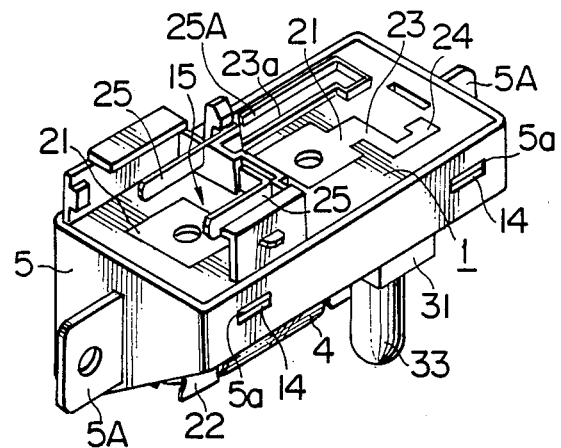
FIG. 3 is a perspective view of the lamp with a switch as viewed from below.

The other connecting terminal 25 is arranged in the connecting terminal mounting section 15, as shown in FIG. 3, and the fixed contact piece 26 is made to extend from underside beyond the top side of the insulating base plate 1 and extend along a groove 31A in the outer side wall surface of the tube 31. Further extends into the interior of the tubular member 31 through a fixed contact piece insertion hole 31B at an upper portion of the tube, as shown in FIG. 1.

The movable contact piece 35 is inserted into the knob box 33A of the switch knob 33, with its top side first. The mounting bore 35A of the movable contact piece 35 will thus receive the projection 33B and the contact sections 35B will project through the splits 33C out of the knob box. Subsequently, a spring 34 is inserted into the box until the projection 33B enters one end of the spring, as shown in FIGS. 5–7.

The push switch 3 is completed by positioning the thus assembled switch knob 33 relative to the tubular member 31 such that the hook portions f of the knob are arranged in the same direction as the hook portions F of the tubular member 31, and subsequently pushing the knob 33 into the tubular member 31 until the projection 31A enters the opposite end of the spring 34 and the hook portions f are forced to clear the hook portions F of the tubular member 31, as shown in FIG. 7.

A bulb 4 is mounted between the bulb sockets 2 attached to the insulating base plate 1, by pressing metal members 4A at the opposite ends of the bulb 4 into the nips between the squeezing pieces 22.

Subsequently, the protective frame 5 can be attached to the insulating base plate 1 if needed, by forcing the frame 5 onto the base plate 1 thereby elastically deforming the frame 5 on the oblique surfaces of the fastening protrusions 14. The fastening protrusions 14 will thus snap into the slots 5A formed in the portions of the protective frame 5 which are near the opening thereof.

The thus assembled lamp and switch is mounted in the trunk of an automobile, for example, by means of the mounting pieces 5A of the protective frame 5 such that the switch knob 33 may be actuated by the trunk hood. A battery is connected between the connecting terminals. When the trunk hood is closed, it will depress the switch knob 33 against the resilience of the spring 34 until the movable contact 35 is separated from the fixed contact 26 as shown in FIG. 6, with the result that the lamp is turned off.

When the trunk hood is opened, the switch knob 33 is allowed to be raised within the tube 31 by the resilient spring 34 up to the position of FIG. 7 in which the hook portions f of the knob abut against the hook portions F of the tube 31, and the movable contact 35 movable with the switch knob 33 will then connect the fixed contact pieces 24 and 26 together, thereby illuminating the bulb 4. The bulb 4 may be turned off by closing the trunk hood, as described.

The means for preventing the switch knob 33 from being drawn out may be constituted by some arrangements other than that which uses the hooks F and f described above. For example, it may comprises a stop plate 33D shown by chain lines in FIG. 5, which is arranged to engage the top face of the knob box 33A.

When the protective frame 5 is not used, the insulating base plate 1 or the tube member 31 may be directly mounted to some support.

Figure 8:
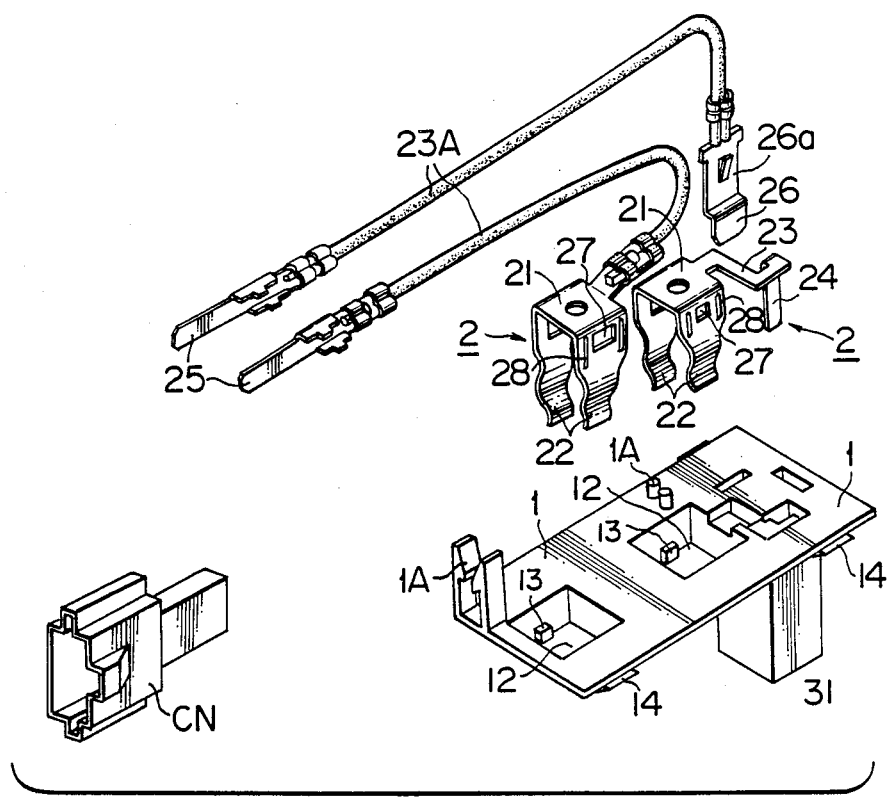
FIG. 8 is an exploded perspective view showing another embodiment of the present invention.
Figure 9:
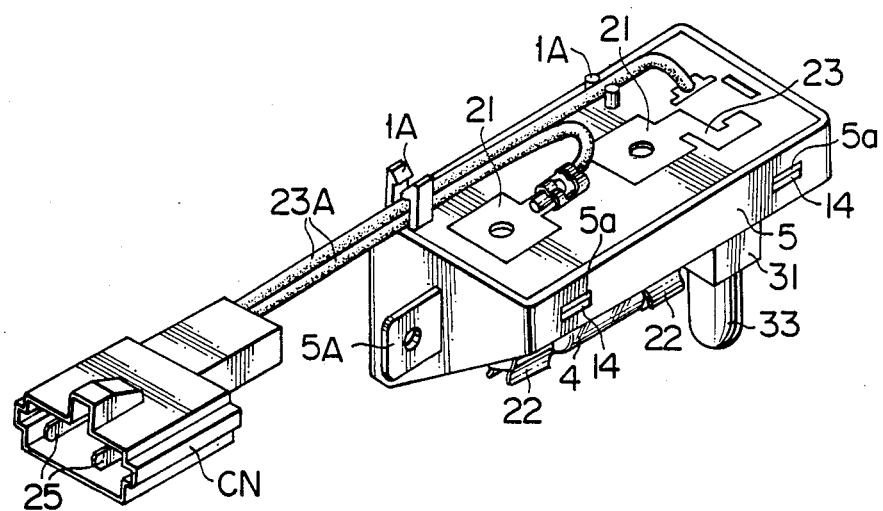
FIG. 9 is a perspective view of the lamp with a switch of FIG. 8 as viewed from below.
Figure 10:
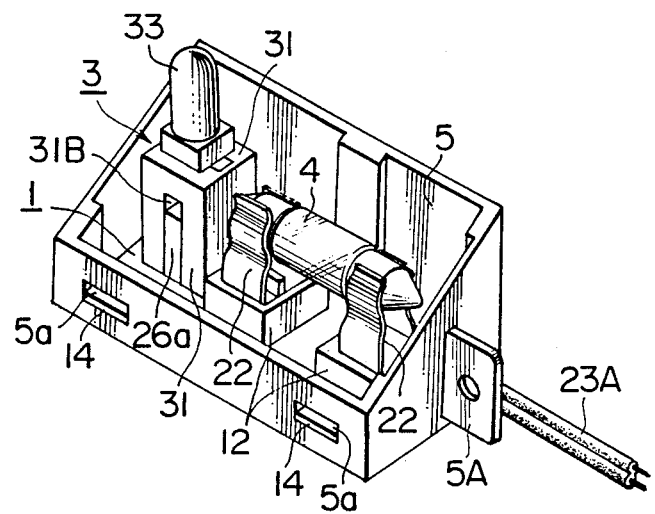
FIG. 10 is a perspective view of the lamp as viewed from above.

FIGS. 8, 9 and 10 show another embodiment of the present invention, in which the connecting terminals 25 of the foregoing embodiment are connected to a connector CN via leads 23A which are squeezed by a lead squeezing structure 1A provided on the insulating base plate 1. The fixed contact piece 26 and the bulb socket 2 are respectively connected to the leads 23A by crimping.

Figure 11:
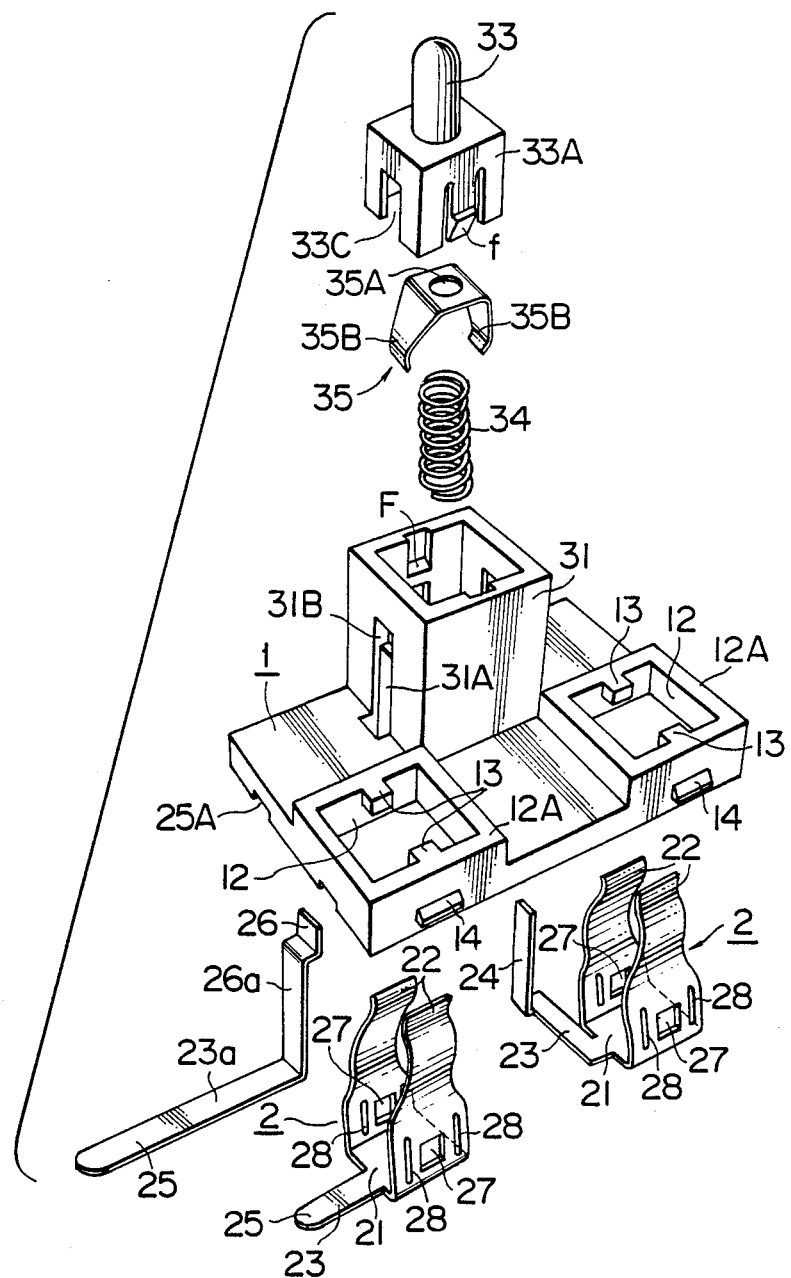
FIGS. 11 through 22 are perspective views showing other embodiments of the present invention.
Figure 12:
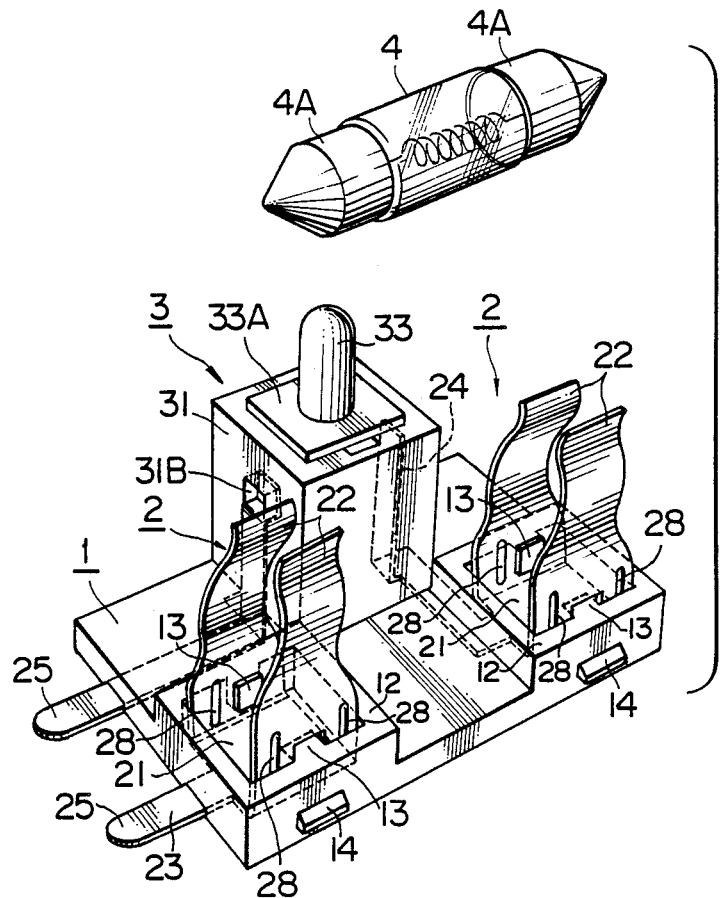
Figure 13:
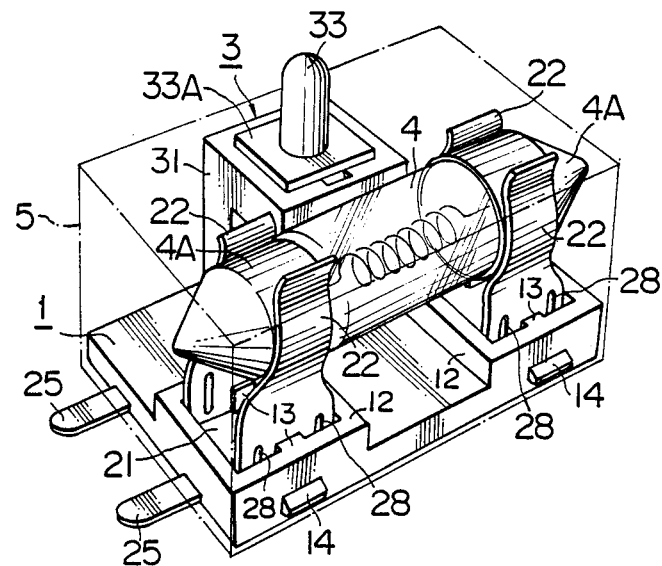

A second embodiment of the lamp with switch according to the present invention, shown in FIG. 11-13, comprises an insulating base plate 1 having socket-insertion sections 12 formed therein having facing protrusions 13. Each bulb socket 2 has a pair of squeezing pieces 22 and a connecting piece 23 so as to mount a bulb 4 therebetween. The sockets being fastened to the socket-insertion sections 12 by means of mounting bores 27 which are formed in the squeezing pieces 22 and which are adapted to engage the protrusions 13. A tubular member 31 formed integral with the insulating base plate 1 adjacent to the bulb sockets 2 on the opposite side of the base plate receives therein a self projecting push switch 3. The push switch 3 includes a switch knob 33 together with a movable contact piece 35 and a spring 34, the movable contact piece 35 being slidable on a fixed contact piece 24 extending from said connecting piece 23 emerging at the inner wall of said tubular member 31 as well as on another fixed contact piece 26 having a connecting terminal 25.

Figure 14:
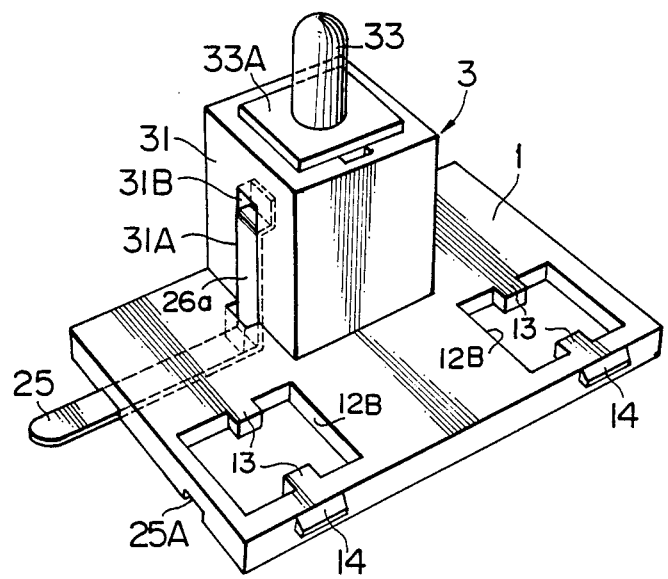

When the insulating base plate 1 has a sufficient thickness, the projecting frame structures 12A surrounding the socket-insertion sections are not necessitated. The bulb sockets 2 may then be mounted to the insulating base plate 1 by means of protrusions 13 which are formed on opposite edges of rectangular holes 12B formed through the insulating base plate 1 and which are adapted to engage the mounting bores 27, as shown in FIG. 14.

Figure 15:
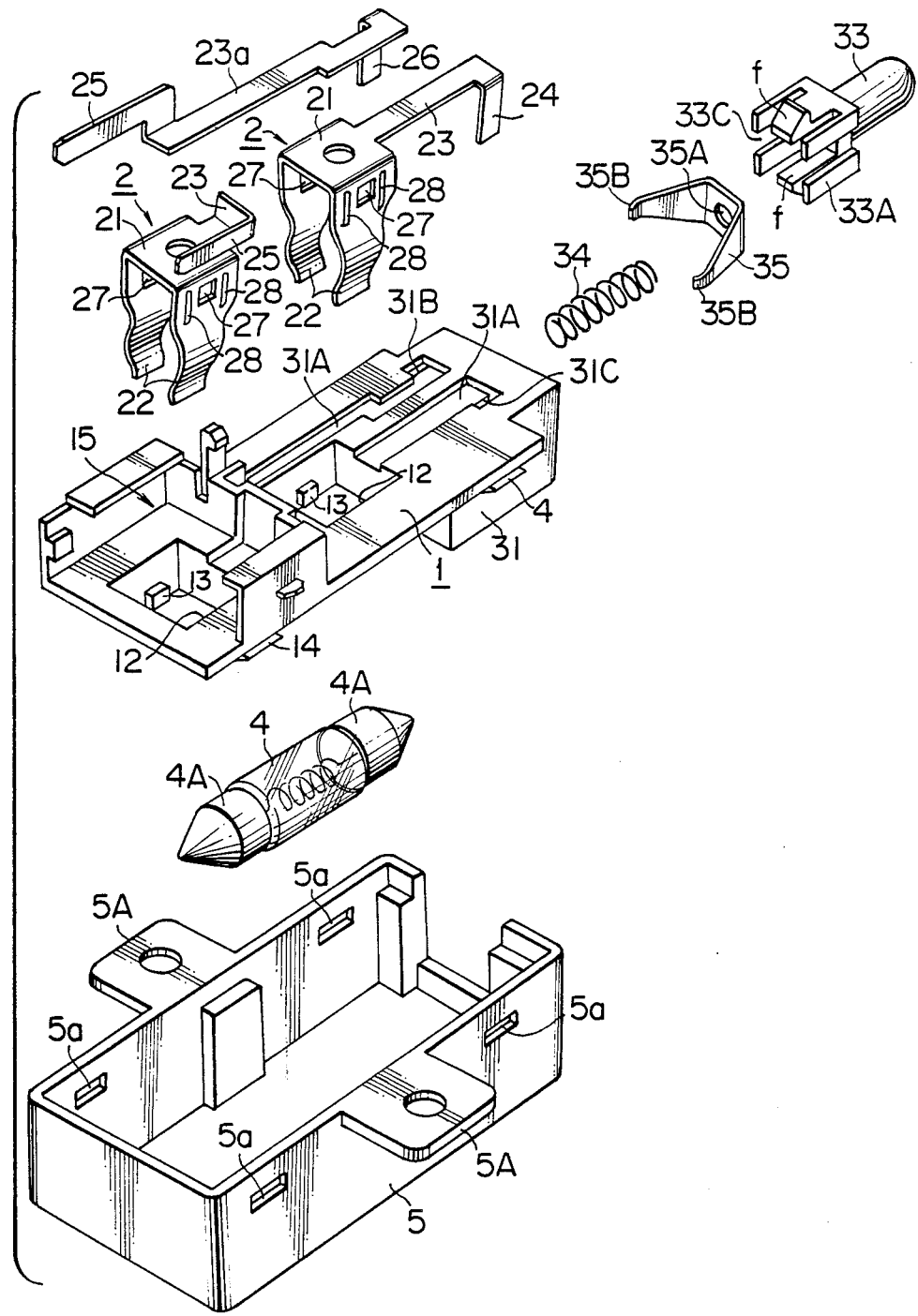
Figure 16:
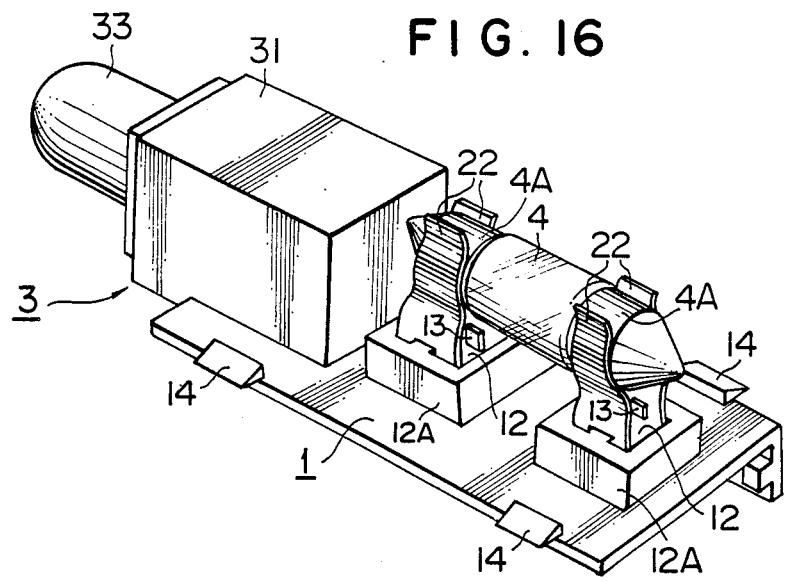
Figure 17:
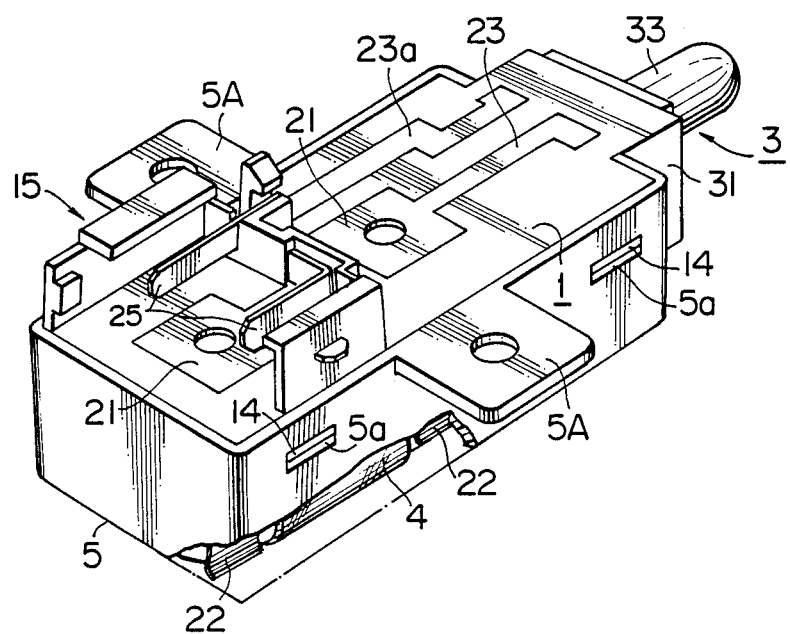

A third embodiment of the present invention, shown in FIGS. 15-17, comprises an insulating base plate 1 having socket-insertion sections 12 formed therein having facing protrusions 13. Bulb sockets 2 each include a pair of squeezing pieces 22 and a connecting piece 23 for mounting a bulb 4 therebetween. The sockets are fastened to the socket-insertion sections 12 by means of mounting bores 27 which are formed in the squeezing pieces 22 and which are adapted to engage the protrusions 13. A tubular member 31 is formed integral with the insulating base plate 1 adjacent to one of the bulb sockets 2 on the opposite side of the base plate 1 for receiving therein a self projecting push switch 3. The tubular member 31 is, moreover, disposed parallel to the bulb 4 when the bulb 4 is mounted between the squeezing pieces 22. The push switch 3 includes switch knob 33, a movable contact piece 35 and a spring 34. The movable contact piece 35 is slidable on a fixed contact piece 24 extending from said connecting piece 23 emerging at the inner wall of said tubular member 31, as well as on another fixed contact piece 26 having a connecting terminal 25.

Figure 18:
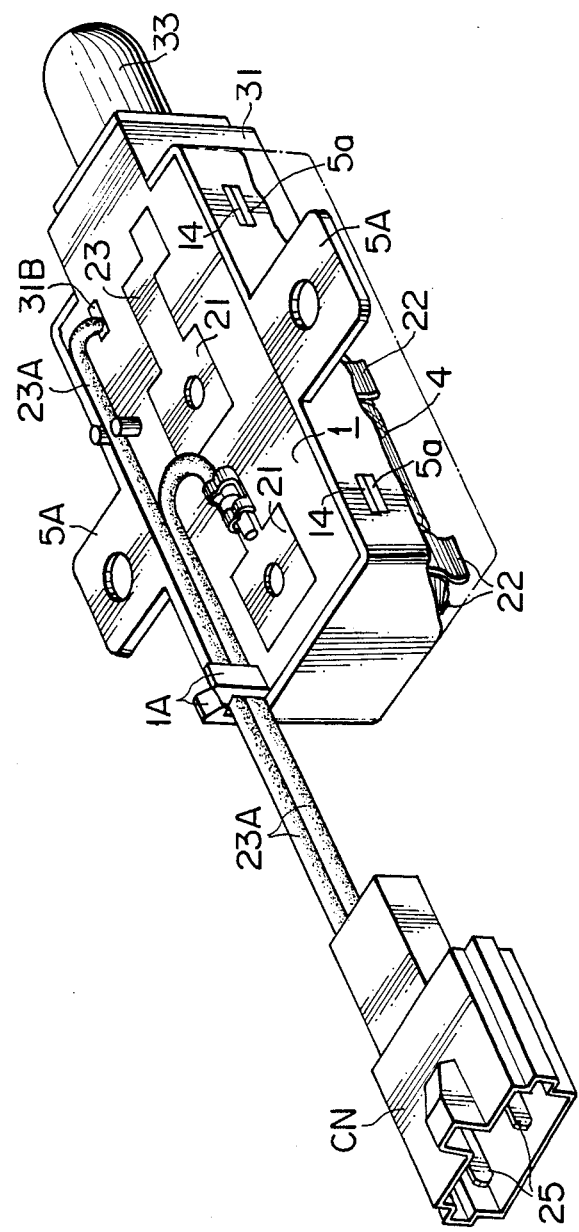

FIG. 18 shows another arrangement, in which the connecting terminals 25 are connected via a connector CN to leads 23A which are squeezed by a lead squeezing structure 1A formed on the insulating base plate 1. The fixed contact piece 26 and one of the bulb sockets are respectively connected to the leads 23A by crimping.

Also in these embodiments the projecting frame structures 12A surrounding the socket insertion sections 12 are not needed when the insulating base plate 1 has a sufficient thickness. The bulb sockets 2 may then be mounted to the insulating base plate 1 by means of protrusions 13 to engage the mounting bores 27, which protrusions are formed on opposite edges of rectangular through holes provided in the insulating base plate 1.

Figure 19:
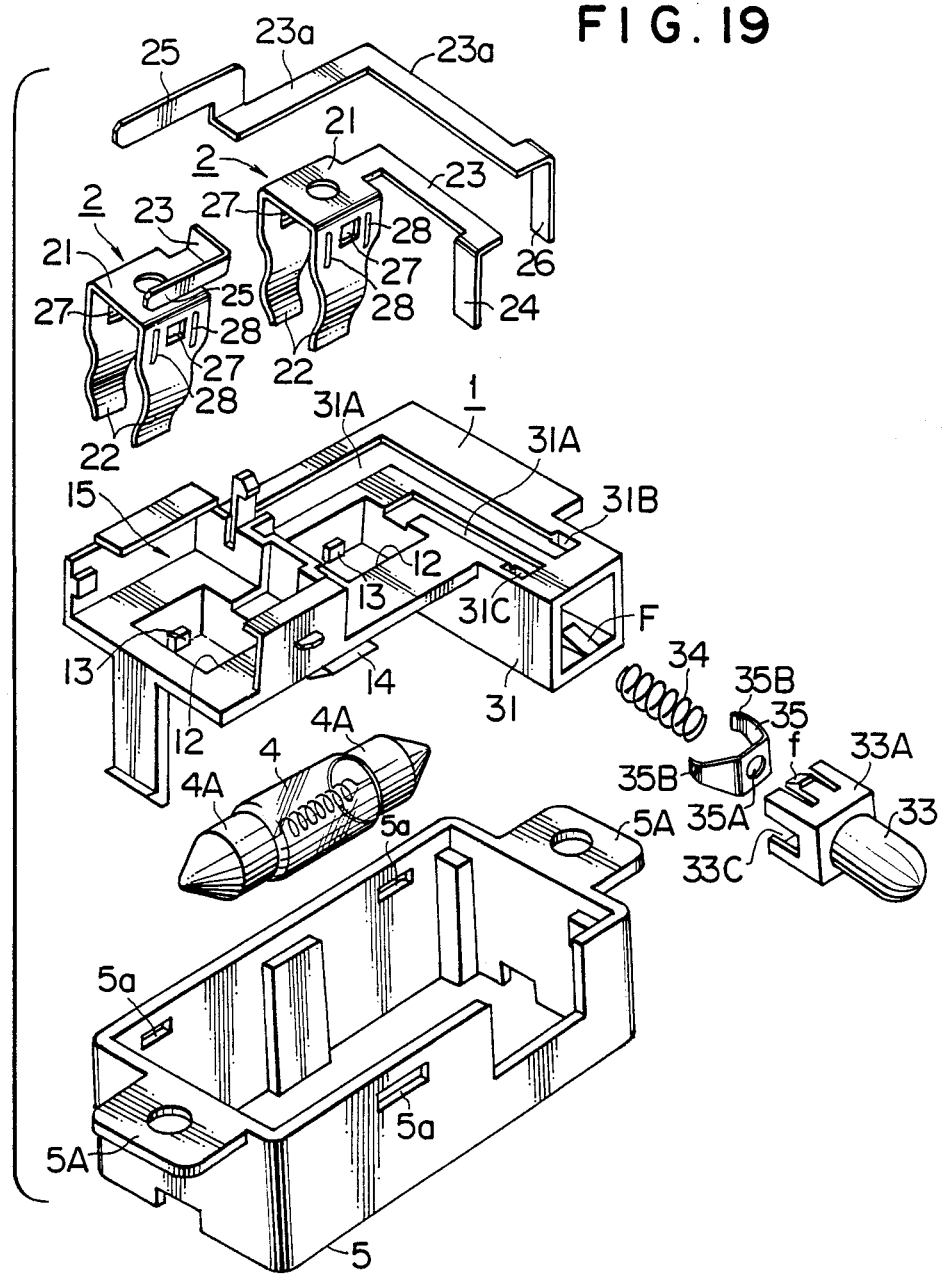
Figure 20:
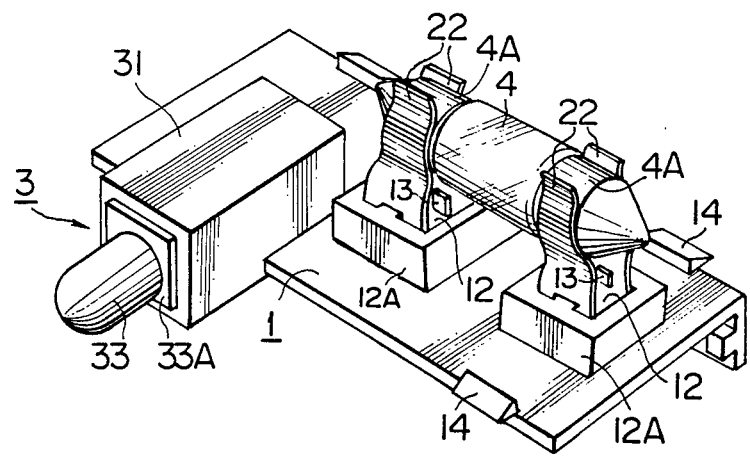
Figure 21:
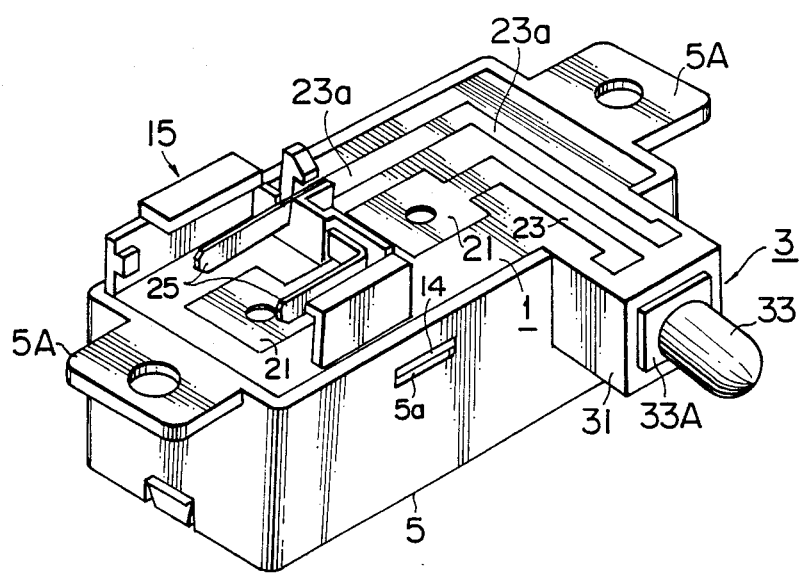

Another embodiment shown in FIGS. 19-21 comprises an insulating base plate 1 having socket-insertion sections 12 formed therein and having facing protrusions 13. Each bulb socket 2 has a pair of squeezing pieces 22 and a connecting piece 23 for mounting a bulb 4 therebetween. The said sockets are fastened to the socket-insertion sections 12 by means of mounting bores 27 which are formed in the squeezing pieces 22 and which are adapted to engage the protrusions 13. A tubular member 31 is formed integral with the insulating base plate 1 adjacent to one of the bulb sockets 2 on the opposite side of the base plate 1 for receiving therein a self projecting push switch 3. The tubular member 31 is disposed essentially a right angle to, but within the same plane as, bulb 4 when mounted between squeezing pieces 22. The push switch 3 includes switch knob 33, movable contact piece 35 and a spring 34. The movable contact piece 35 is slidable on a fixed contact piece 24 extending from said connecting piece 23 emerging at the inner wall of said tubular member 31, as well as on another fixed contact piece 26 having a connecting terminal 25.

Figure 22:
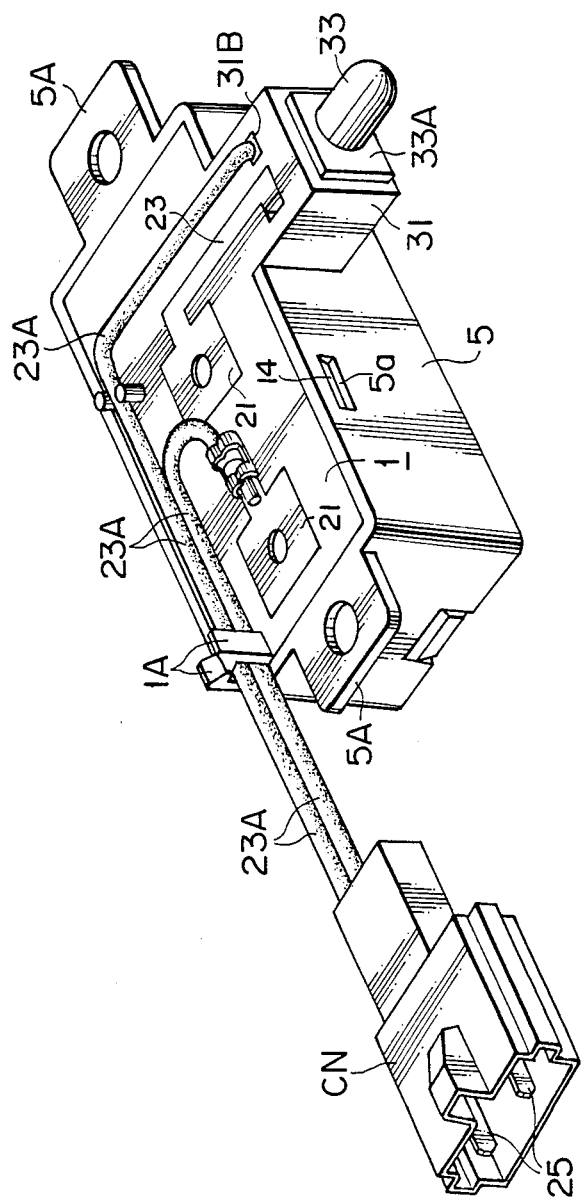

FIG. 22 shows a modified version of the embodiment described just above, in which the connecting terminals 25 are connected via a connector CN to leads 23A which are squeezed by a lead squeezing structure 1A formed on the insulating base plate 1. The fixed contact piece 26 and one of the bulb sockets are respectively connected to the leads 23A by crimping.

Also in these embodiments the projecting frame structures 12A surrounding the socket insertion sections 12 are not needed when the insulating base plate 1 has a sufficient thickness. The bulb sockets 2 may then be mounted to the insulating base plate 1 by means of protrusions 13 to engage the mounting bores 27, which protrusions are formed on opposite edges of rectangular through holes provided in the insulating base plate 1.

The present invention described above, by way of example, is advantageous since the integral lamp and switch can be implemented in a compact form and can be used conveniently. It can also be manufactured at low costs since the tubular member for accommodating the push switch is formed integrally with the insulating base plate. The lamp/switch is of nugged construction and can withstand violent actions of an external actuating member, such as a trunk hood. The lamp/switch can reliably be turned on and off by the opening or closing movement of the trunk hood since the switch knob is smoothly returned and is rarely caught or clogged with dust. Since the components are arranged to form a single structure, the lamp can be easily assembled and mounted, and hence is especially adapted to automated assembly.

In addition to the above advantages, the lamp with an integral switch may be provided with a protective frame. Thus, the bulb and the push switch can be protected in an narrow trunk space and can easily be mounted therein.

The push switch of the lamp according to the present invention can easily be assembled by a single operation of pushing it into a tubular member. The switch knob can subsequently be prevented from being drawn out due to suitable stop members.

Finally the lamp according to the present invention has a further advantage in that the bulb sockets 2 can be formed with various shapes and can be mounted in various manners. Therefore, various types of bulbs can be accommodated.

What is claimed is:

1. A lamp assembly with an integral switch, said lamp assembly comprising:
   (a) an electrically insulating base plate;
   (b) a pair of bulb sockets each of which consists of a conductive plate formed into a U-shaped configuration so as to establish a pair of squeezing pieces;
   (c) an elongate bulb operatively held by means of said bulb sockets;
   (d) said squeezing pieces defining mounting bores;
   (e) connecting pieces extending from said conductive plates;
   (f) said insulting base plate having projecting socket-insertion sections for mounting said bulb sockets to said insulating base plate, and having protrusions which are engaged with a respective one of said mounting bores;
   (g) a tubular member formed integrally with said insulating base plate on one side thereof and having a pair of opposing fixed electrical contact pieces, said fixed contact pieces extending from respective ones of said connecting pieces and into said tubular member;
   (h) a push switch mounted within said tubular member, said push switch having (1) a switch knob received within said tubular member and capable of reciprocal movements therewithin between extended and retracted positions, (2) a movable contact piece and (3) a spring, the movable contact piece being slidably brought into contact with said pair of fixed contact pieces when said switch knob is in said extended position so as to make an electrical circuit between said bulb sockets and a source of electrical power, whereby said bulb is illuminated, and being separated from at least one of said fixed contact pieces when said switch knob is in said retracted position so as to break the electrical circuit between said bulb sockets and the source of electrical power, whereby said bulb is extinguished.

2. The lamp assembly as claimed in claim 1, further comprising a protective frame provided around the insulating base plate.

3. The lamp assembly as claimed in claim 1, wherein the tubular member is provided with stationary hooks and, wherein the switch knob is provided with movable hooks engageable with corresponding stationary hooks provided on the tubular member.

4. A lamp assembly with an integral switch, said lamp assembly comprising:
   (a) an insulating base plate having socket-insertion sections formed therein and a pair of opposing protrusions;
   (b) a pair of bulb sockets each having a pair of squeezing pieces and a connecting piece, said squeezing pieces defining mounting bores, said sockets being fastened to the socket-insertion sections by means of said mounting bores which are engaged with the protrusions;
   (c) an elongate bulb operatively held by means of said bulb sockets;
   (d) a tubular member formed integrally with the insulating base plate adjacent to the bulb sockets on an opposite side of the base plate; and
   (e) a push switch mounted within said tubular member, said push switch having (i) a switch knob received within said tubular member and capable of reciprocal movements between extended and retracted positions, (2) a movable contact piece, and (3) a spring, the movable contact piece being slidably brought into contact with said pair of fixed contact pieces when said switch knob is in said extended position so as to make an electrical circuit between said bulb sockets and a source of electrical power, whereby said bulb is illuminated, and being separated from at least one of said fixed contact pieces when said switch knob is in said retracted position so as to break the electrical circuit between said bulb sockets and the source of electrical power, whereby said bulb is extinguished.

5. A lamp assembly with an integral switch, said lamp assembly comprising comprises:
   (a) an insulating base plate having socket-insertion sections formed therein and a pair of opposing protrusions;
   (b) a pair of bulb sockets each having a pair of squeezing pieces and a connecting piece said squeezing pieces defining mounting bores, said sockets being fastened to the socket-insertion sections by means of said mounting bores and which are engaged with the protrusions;
   (c) an elongate bulb operatively held by means of said bulb sockets;
   (d) a tubular member formed integrally with the insulating base plate and extending in a direction parallel to said elongate bulb when mounted between said pair of bulb sockets, said tubular member also being disposed adjacent to one of the bulb sockets on an opposite side of the base plate; and (e) a push switch mounted within said tubular member, said push switch including (1) a switch knob received within said tubular member and capable of reciprocal movements between extended and retracted positions, (2) a movable contact piece and (3) a spring, the movable contact piece being slidably brought into contact with said pair of fixed contact pieces when said switch knob is in said extended position so as to make an electrical circuit between said bulb sockets and a source of electrical power, whereby said bulb is illuminated, and being separated from at lest one said fixed contact pieces when said switch knob is in said retracted position so as to break the electrical circuit between said bulb sockets and the source of electrical power, whereby said bulb is extinguished.

6. A lamp assembly with an integral switch, said lamp assembly comprising comprises:

(a) an insulating base plate having socket-insertion sections formed therein and a pair of opposing protrusions;

(b) a pair of bulb sockets each having a pair of squeezing pieces and a connecting piece said squeezing pieces defining mounting bores, said sockets being fastened to the socket-insertion sections by means of said mounting bores which are formed in the squeezing pieces and which are engaged with the protrusions;

(c) an elongate bulb operatively held by means of said bulb sockets;

(d) a tubular member formed integrally with the insulating base plate and extending in a direction perpendicular to said elongate bulb when mounted between said pair of bulb sockets, said tubular member also being disposed adjacent to one of the bulb sockets on an opposite side of the base plate; and (e) a push switch mounted within said tubular member, said push switch including (1) a switch knob received within said tubular member and capable of reciprocal movements between extended and retracted positions, (2) a movable contact piece and (3) a spring, the movable contact piece being slidably brought into contact with said pair of fixed contact pieces when said switch knob is in said extended position so as to make an electrical circuit between said bulb sockets and a source of electrical power, whereby said bulb is illuminated, and being separated from at lest one of said fixed contact pieces when said switch knob is in said retracted position so as to break the electrical circuit between said bulb sockets and the source of electrical power, whereby said bulb is extinguished.

7. A lamp assembly adapted to hold an elongate bulb, said lamp assembly comprising:

a lamp base;

a pair of separated bulb sockets for resiliently holding the elongate bulb therebetween;

electrical connector means for electrically connecting said bulb sockets in series with a source of electrical power, said electrical connector means including switch means for making and breaking said electrical connection between the bulb and the electrical power source so as to respectively illuminate and extinguish illumination of the bulb; wherein said switch means includes;

(a) a tubular member integrally formed with said lamp base and having interior walls which define a tubular interior space;

(b) a switch knob slidably received within said tubular interior space of said tubular member for reciprocal rectilinear movements therewithin between extended and retracted positions;

(c) spring means operatively associated with said switch knob for biasing said switch knob into said extended position;

(d) a movable electrical contact piece having a pair of contact sections which contact a corresponding pair of said interior walls of said tubular member during sliding movements of said switch knob within said defined tubular interior space;

(e) first and second fixed electrical contacts respectively electrically connected to one and another of said pair of bulb sockets, (f) each said first and second electrical contacts having portions which extend along said corresponding interior walls of said tubular member so as to be capable of being in contact with said contact sections of said movable contact piece, wherein (g) said contact sections of said movable contact piece (i) are in electrical contact with each said portion of said first and second fixed contacts when said switch knob is in said extended position to thereby make an electrical circuit between the power source and the bulb sockets, whereby the bulb is illuminated, and (ii) are separated from at least one of said portions of said first and second fixed contacts when said switch knob is in said retracted position to thereby break the electrical circuit between the power source and the bulb sockets, whereby the bulb is extinguished.

* * * * *